United States Patent Office 3,291,806
Patented Dec. 13, 1966

3,291,806

METHANO-BENZAZEPINIUM COMPOUNDS

Gordon Northrop Walker, Morristown, N.J., and Karl Schenker, Binningen, Switzerland, assignors to Ciba Corporation, New York, N.Y., a corporation of Delaware No Drawing. Filed Feb. 8, 1966, Ser. No. 525,870
16 Claims. (Cl. 260—313.1)

This is a continuation-in-part of application Serial No. 385,767, filed July 28, 1964, now abandoned.

The present invention concerns and has for its object the provision of N-substituted 1,4-dihydro-5H-1,4-methano-3-benzazepinium compounds, particularly those of the formula

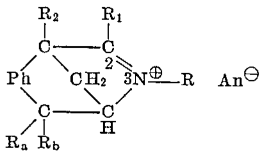

in which Ph is a 1,2-phenylene radical, each of the groups R and $R_1$ is an organic radical having aliphatic characteristics, each of $R_2$ and $R_a$ is hydrogen or an organic radical, $R_b$ is hydrogen, hydroxyl or functionally converted hydroxyl and $An^{\ominus}$ is the anion of an acid, as well as their 2,3-dihydro-derivatives and the free bases of the latter.

An organic radical with aliphatic characteristics representing the group R, as well as the group $R_1$, stands, for example, for an aliphatic radical, such as alkyl, particularly lower alkyl, e.g. methyl, ethyl, n-propyl, isopropyl, n-butyl, isobutyl, n-pentyl, n-hexyl, n-heptyl and the like. It may also be higher alkyl, e.g. n-heptyl, n-octyl, n-nonyl, n-decyl, n-undecyl, n-dodecyl and the like, or alkenyl, such as lower alkenyl, e.g. allyl and the like, as well as a cycloaliphatic group, such as cycloalkyl having from three to eight, preferably from five to six, ring carbon atoms, e.g. cyclopentyl or cyclohexyl, as well as cyclopropyl, cycloheptyl and the like, or cycloalkenyl having from five to eight, preferably from five to six, ring carbon atoms, e.g. 2-cyclopentenyl, 1-cyclohexenyl, 3-cyclohexenyl and the like, as well as 1-cycloheptenyl, 3-cycloheptenyl, 1-cyclooctenyl and the like, a cycloaliphatic-aliphatic group, such as cycloalkyl-lower alkyl, in which cycloalkyl has from three to eight, preferably from five to six, ring carbon atoms, e.g. cyclopentylmethyl, 3-cyclopentylpropyl, cyclohexylmethyl, 2-cyclohexylethyl and the like, as well as cyclopropylmethyl, 1-cyclopropylethyl, cycloheptylmethyl and the like, or cycloalkenyl-lower alkyl, in which cycloalkenyl has from five to eight, preferably from five to six, ring carbon atoms, e.g. 1-cyclopentenylmethyl, 2-cyclohexenylmethyl, 2-(3-cyclohexenyl)-ethyl and the like, or an aryl-aliphatic group, such as a carbocyclic aryl-lower aliphatic group, particularly monocyclic carbocyclic aryl-lower alkyl, for example, phenyl-lower alkyl, e.g. benzyl, 1-phenylethyl, 2-phenylethyl and the like, or substituted phenyl-lower alkyl, as well as bicyclic carbocyclic aryl-lower alkyl, for example, naphthyl-lower alkyl, e.g. 1-naphthylmethyl, 2-naphthylmethyl and the like, or substituted naphthyl-lower alkyl, or a heterocyclic aryl-lower aliphatic group, especially azacyclic aryl-lower alkyl, for example, pyridyl-lower alkyl, e.g. 2-pyridylmethyl, 4-pyridylmethyl and the like, or substituted pyridyl-lower alkyl, or any other suitable organic group having aliphatic characteristics.

The above organic radicals representing R, especially lower alkyl, may also have one or more than one of the same or of different substituents attached to any of the positions available for substitution. Substituents are, for example, lower alkyl, e.g. methyl, ethyl, n-propyl, isopropyl, n-butyl and the like, etherified hydroxyl, especially lower alkoxy, e.g. methoxy, ethoxy, n-propyloxy, butyloxy and the like, esterified hydroxyl, especially halogeno, e.g. fluoro, chloro, bromo and the like, amino, such as N,N-di-substituted amino, for example, N,N-di-lower alkyl-amino, e.g. N,N-dimethylamino, N,N-diethylamino and the like, N,N-alkyleneimino, in which alkylene has from four to seven carbon atoms, e.g. 1-pyrrolidino, 1-piperidino, 1-N,N-(1,6-hexylene)-imino and the like, trifluoromethyl, carboxyl, carbo-lower alkoxy, e.g. carbomethoxy, carbethoxy and the like, or any other equivalent substituent.

Although the 1-position of the 1,4-dihydro-5H-1,4-methano-3-benzazepinium portion may be unsubstituted, it is preferably substituted by an organic radical. The group $R_2$, apart from being hydrogen, may, therefore, be one of the above organic radicals representing the group $R_1$, particularly an aryl group such as carbocyclic aryl, especially monocyclic carbocyclic aryl, e.g. phenyl or substituted phenyl, suh as (lower alkyl)-phenyl, (lower alkoxy)-phenyl, (halogeno)-phenyl, (N,N-di-lower alkyl-amino)-phenyl, (trifluoromethyl)-phenyl and the like.

While the group $R_a$ is advantageously hydrogen, it may also be an organic radical, i.e. an organic radical of aliphatic characteristics or an aryl group, such as one of the previously-described substituents.

The group $R_b$ is primarily hydrogen, but may also be hydroxyl or functionally converted hydroxyl, such as etherified hydroxyl, e.g. lower alkoxy, phenyl-lower alkoxy and the like, or esterified hydroxyl, e.g. lower alkanoyloxy and the like.

The hexacyclic carbocyclic aryl portion of the 1,4-dihydro-5H-1,4-methano-3-benzazepinium ring system, represented in the above formula by the divalent 1,2-phenylene group Ph, is unsubstituted or may be substituted by one or more than one of the same or different substituents attached to any of the positions available for substitution. Substituents are those mentioned before, and substituted 1,2-phenylene radicals are primarily (lower alkyl)-1,2-phenylene, (lower alkoxy)-1,2-phenylene, (halogeno)-1,2-phenylene, (N,N-di-lower alkyl-amino)-1,2-phenylene, (trifluoromethyl) - 1,2 - phenylene and the like.

The anion portion of the 1,4-dihydro-5H-1,4-methano-3-benzazepinium salts of this invention representing $An^{\ominus}$ in the above formula is the anion of an acid, especially the pharmaceutically acceptable anion of an acid, such as the anion of an inorganic acid, e.g. hydrochloric, hydrobromic, nitric, sulfuric, phosphoric acid and the like, as well as of an organic acid, such as an organic carboxylic acid, e.g. acetic, propionic, glycolic, malonic, succinic, maleic, hydroxymaleic, fumaric, malic, tartaric, citric, benzoic, salicylic, 4-amino-salicylic, 2-acetyloxybenzoic, nicotinic, isonicotinic acid and the like, or of an organic sulfonic acid, e.g. methane sulfonic, ethane sulfonic, ethane 1,2-disulfonic, 2-hydroxyethane sulfonic, benzene sulfonic, toluene sulfonic, napthalene 2-sulfonic acid and the like. Other anions representing $An^{\ominus}$ are, for example, those of acidic organic nitro compounds, e.g. picric, picrolonic, flavianic acid and the like, of heavy metal complex acids, e.g. phosphotungstic, phosphomolybdic, chloroplatinic, Reinecke acid and the like, or of other acids forming suitable anions, e.g. perchloric acid and the like; compounds having anions of acid of that type are, for example, useful as intermediates in the manufacture of compounds having other anions, as well as for identification or characterization purposes.

The compounds of this invention may be in the form of mixtures of isomeric compounds or of single isomers;

hus, they may be in the form of racemates or optically .ctive antipodes.

Resulting compounds or derivates thereof may contain vater and/or solvent of crystallization.

The compounds of this invention exhibit pronounced liuretic, natriuretic and chloriuretic properties. A paricular advantage of compounds of this invention is their ack of kaliuresis, which usually accompanies the diuretic, iatriuretic and chloriuretic properties of known non-merurial diuretic compounds. The compounds of this inention are, therefore, useful as diuretic, natriuretic and hloriuretic agents, for example, in the treatment of excessive water, sodium and chlorine retention due, for xample, to heart failure, kidney conditions and the like. Furthermore, compounds of this invention have antihyperensive, as well as hypoglycemic properties and are, thereore, useful as antihypertensive agents in the treatment of iypertension, or as hypoglycemic agents in the treatment f hyperglycemia.

Especially useful are the compounds of the formula

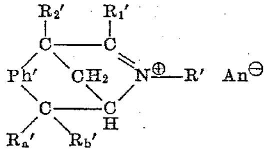

n which Ph′ is 1,2-phenylene, (lower alkyl)-1,2-phenylne, (lower alkoxy) - 1,2 - phenylene, (halogeno) - 1,2-henylene, (N,N - di-lower alkylamino) - 1,2 - phenylene r (trifluoromethyl)-1,2-phenylene, each of R′ and $R_1'$ is ower alkyl, each of $R_2'$ and $R_a'$ is hydrogen, lower alkyl, henyl, (lower alkyl)-phenyl, (lower alkoxy)-phenyl, halogeno) - phenyl, (N,N - di - lower alkylamino)-henyl or (trifluoromethyl)-phenyl, $R_b'$ is hydrogen or iydroxyl and $An^{\ominus}$ the anion of an acid, especially that of a harmaceutically acceptable acid, particularly of a hydroalic acid. Particularly valuable are those compounds in vhich Ph′ stands for 1,2-phenylene, each of R′ and $R_1'$ or lower alkyl, $R_2'$ for lower alkyl or phenyl, $R_a'$ for iydrogen, lower alkyl or phenyl, $R_b'$ for hydrogen or iydroxyl and $An^{\ominus}$ for a halogenid ion.

The compounds of this invention are used in the form of compositions for enteral, e.g. oral and the like, or parnteral use, which compose a pharmacologically effecive amount of the active compound of this invention in idmixture with a pharmaceutically aceptable organic or norganic, solid or liquid carrier, which usually repreents the major portion of the pharmaceutical composiion. For making up the latter, there are employed the isual carrier materials suitable for the manufacture of harmaceutical compositions, such as water, gelatine, sugirs, e.g. lactose, sucrose, glucose and the like, starches, ;.g. corn starch, wheat starch, rice starch and the like, tearic acid or salts thereof, e.g. magnesium stearate, calium stearate and the like, talc, vegetable oils, ethonol, tearyl, benzyl alcohol, gums, accacia, tragacanth, polyilkylene glycols, propylene glycol or any other suitable xcipient or mixtures thereof. The compositions may be n solid form, e.g. capsules, tablets, dragees and the like, r in liquid form, e.g. solutions, suspensions, emulsions ind the like. If desired, they may contain auxiliary substances, such as preserving, stabilizing, wetting, emulsifyng, coloring, flavoring agents and the like, salts for vary-compositions, which, if desired, may also contain, in comositions are prepared according to the standard methods ised for the manufacture of pharmaceutically acceptable compositions, which, if desired, may also contain, in comination, other physiologically useful substances, particuarly antihypertensive reagents, such as a reserpine-type compound, e.g. reserpine, deserpidine, syrosingopine and he like, a hydrazino-phthalazine, e.g. 1-hydrazino-phthalazine, 1,4-dihydrazino-phthalazine and the like, an α-imino-acid, e.g. α-methyldopa and the like, an antihyperensive monoamineoxidase inhibitor, e.g. pargyline and the like, or any other antihypertensive agent, as well as other diuretic and saluretic agents, such as a compound of the 1,2,4-benzo-thiadiazine-1,1-dioxide series, e.g. chlorothiazide, hydrochlorothiazide, polythiazide, hydroflumethiazide and the like, of the quinazolin-4-one series, e.g. quinethazone and the like, or of the phthalimidine series, e.g. chlorthalidone and the like.

The 1 - $R_2$ - 2 - $R_1$ - 3 - R - 5 - $R_a$ - 5 - $R_b$ - 1,4 - dihydro-5H-1,4-methano-3-benzazepinium salts of this invention, in which $R_1$ is an organic radical of aliphatic characteristics, the α-carbon atom of which has at least one hydrogen, are prepared, for example, by reacting a 1 - $R_2$ - 2 - $R_1°$ - 3 - R - 5 - $R_a$ - 5 - $R_b$ - 1,2,3,4 - tetrahydro-5H-1,4-methano-3-benzazepine, especially a compound of the formula

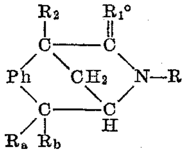

in which Ph, R, $R_2$, $R_a$ and $R_b$ have the previously-given meaning, and $R_1°$ is an organic ylidene radical having aliphatic characteristics, with an acid, as well as with a reactive ester of a sterically hindered alcohol having aliphatic characteristics and a proton source, and, if desired, converting in a resulting compound the anion into another anion, and/or, reducing a resulting compound and/or converting a resulting base into its acid addition salts or an acid addition salt into the corresponding base.

The organic ylidene radical $R_1°$ represents an organic group of aliphatic characteristics, in which the α-carbon substitutes the carbon atom representing the 2-position of the 1,2,3,4 - tetrahydro - 5H - 1,4 - methano - 3 - benzazepine ring system through a carbon-to-carbon double bond. The group $R_1°$ is above all lower alkylidene, e.g. methylene, ethylidene, n-propylidene, isopropylidene, n-butylidene and the like, but may be any other suitable organic ylidene radical having aliphatic characteristics, such as a cycloaliphatic ylidene radical, for example, cycloalkylidene having from three to eight, preferably from five to six, ring carbon atoms, e.g. cyclopentylidene, cyclohexylidene and the like, a cycloaliphatic-aliphatic ylidene radical, for example, cycloalkyl-lower alkylidene, in which cycloalkyl has from three to eight, preferably from five to six, ring carbon atoms, e.g. cyclopentylmethylene, 3-cyclopentylpropylidene, cyclohexylmethylene, 2-cyclohexylethylidene and the like, an aryl-aliphatic ylidene radical, such as a carbocyclic aryl-aliphatic ylidene radical, particularly monocyclic carbocyclic aryl-lower alkylidene, such as phenyl-lower alkylidene, e.g. benzylidene, 1-phenylethylidene, 2-phenylethylidene and the like, or any other suitable organic ylidene group having aliphatic characteristics.

The acid used in the above reaction, which, in the case of a hydrohalic acid, e.g. hydrochloric, hydrobromic acid and the like, may be in gaseous form, or a solution thereof in a solvent or solvent mixture, is added to the starting material or a solution thereof; if necessary, the reaction is carried out while cooling or at an elevated temperature, and/or, in the atmosphere of an inert gas, e.g. nitrogen.

A reactive ester of a sterically hindered alcohol having aliphatic characteristics is particularly an ester thereof with a strong inorganic acid, such as hydrochloric, hydrobromic, hydriodic, sulfuric acid and the like, or with a strong organic sulfonic acid, e.g. methane sulfonic, 2-hydroxyethane sulfonic, p-toluene sulfonic acid and the like. A sterically hindered alcohol of aliphatic characteristics is either a higher primary alkanol or a secondary or tertiary alkanol, a cycloalkanol or any other analogous aliphatic alcohol, particularly an aryl-aliphatic alcohol, such as a monocyclic carbocyclic aryl-lower alkanol, especially a phenyl-lower alkanol, e.g. benzyl alcohol and the like. Particularly useful esters of the above alcohols are either the higher primary alkyl halides, e.g. bromides, iodides and the like, or the secondary or tertiary alkyl halides, the cycloalkyl halides or any other analogous aliphatic halide, particularly the aryl-aliphatic halides, such as the monocyclic carbocyclic aryl-lower alkyl halides, especially the phenyl-lower alkyl halides, e.g. benzyl or 1-phenylethyl chloride or bromide and the like, or the corresponding organic sulfonates.

The reaction of the starting material with a reactive ester of a sterically hindered alcohol having aliphatic characteristics is preferably carried out in the presence of a solvent or a solvent mixture, which may also serve as the proton source. The latter may be a lower alkanol, e.g. ethanol and the like, water or any other suitable reagent, or a moist solvent. The proton donor may be present in the reaction of the starting material with the reactive ester, or it may be used subsequently. If necessary, the reaction is carried out while cooling or at an elevated temperature, in a closed vessel, and/or, in the atmosphere of an inert gas.

The starting materials used in the above procedure are new and are intended to be included within the scope of this invention, including lower alkyl quaternary derivatives thereof, in which lower alkyl has a sterically non-hindered $\alpha$-carbon atom and is especially non-branched lower alkyl, e.g. methyl, ethyl and the like. Particularly useful starting materials are the compounds of the formula

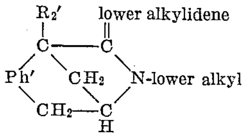

in which Ph' and $R_2'$ have the previously-given meanings, as well as lower alkyl quaternary compounds, particularly halides, in which lower alkyl is preferably unbranched. Apart from serving as starting materials, the above compounds also have useful pharmacological properties, particularly diuretic and saliuretic effects.

The above starting materials are prepared, for example by reacting a 1-R-3-$R_2$-5-$R_a$-5-$R_b$-1,2,3,4-tetrahydro-5H-1,4-methano-3-benzazepin-2-one with an organometallic reagent of the formula $M^{\oplus}R_1^{\ominus}$, in which $R_1^{\ominus}$ is an organic radical of aliphatic characteristics, the $\alpha$-carbon atoms of which has at last one hydrogen, and in which $M^{\oplus}$ stands for the positively charged ion of certain metals of the IA-group of the Periodic System, as well as for the positively charged ion of the formula Met-Hal$^{\oplus}$, in which Met represents certain divalent metals of the IIA-group and the IIB-group of the Periodic System, and Hal is halogeno, or with a tricarbocyclic aryl-$R_1°$ phosphorane reagent, in which $R_1°$ is an organic ylidene radical having aliphatic characteristics.

Treatment of a 1-$R_2$-3-R-5-$R_a$-5-$R_b$-1,2,3,4-tetrahydro-5H-1,4-methano-3-benzazepin-2-one compound with the organometallic reagent $M^{\oplus}R_1^{\ominus}$ is carried out according to known methods. The ion $M^{\oplus}$ represents, for example, the positve ion of an alkali metal, especially lithium, as well as sodium and the like; it may also be the positive ion of the formula Hal-Mg$^{\oplus}$, in which Hal represents halogeno, e.g. chloro, bromo, iodo and the like. Both types of reagents are used under similar conditions; preferably, the alkali metal compound or the Grignard reagent is prepared separately and is then reacted with the lactam. The diluent used during the preparation of the organometallic reagent, for example, diethyl ether and the like, may be diluted or replaced by other solvents or solvent mixtures, for example, by another ether, such as a monocyclic carbocyclic aryl lower alkyl ether, e.g. anisole and the like, a di-monocyclic carbocyclic aryl-ether, e.g. diphenyl ether and the like, a cyclic ether, e.g. tetrahydrofuran, p-dioxan and the like, an organic base, e.g. pyridine, N-methyl-morpholine and the like, a monocyclic carbocyclic aryl hydrocarbon, e.g. benzene, toluene, xylene and the like, or an aliphatic hydrocarbon, e.g. pentane, hexane and the like, or any other suitable solvent or solvent mixture If necessary, the reaction is carried out while cooling or at an elevated temperature, and the atmosphere of inert gas, e.g. nitrogen, may be required, particularly when an alkali metal reagent is used. The resulting reaction mixture is worked up according to known methods; thus, a complex of organometallic nature may be broken, for example, by adding water or a weak acid, such as acetic acid, ammonium chloride and the like, or an aqueous solution thereof.

The reaction of a 1-$R_2$-3-R-5-$R_a$-5-$R_b$-1,2,3,4-tetrahydro-5H-1,4-methano-3-benzazepin-2-one compound with a tri-carbocyclic aryl-$R_1°$-phosphorane reagent (a so-called Wittig reagent), in which $R_1°$ is an organic ylidene radical having aliphatic characteristics, and which is, more especially, a tri-monocyclic carbocyclic aryl-$R_1°$-phosphorane reagent, such as a lower alkylidene-triphenyl-phosphorane and the like, is carried out according to the procedure known as the Wittig reaction. The phosphorane reagent is prepared, for example, by reacting a tri-carbocyclic aryl-phosphine, such as a tri-monocyclic carbocyclic aryl-phosphine, particularly triphenyl-phosphine, with an organic halide of aliphatic characteristics, for example, a compound of the formula $R_1$-Hal, in which $R_1$ and Hal have the previously-given meaning, such as a lower alkyl halide, particularly bromide, as well as chloride or iodide, and treating a resulting trimonocyclic carbocyclic aryl-$R_1$-phosphonium halide with an equivalent amount of a suitable base capable of eliminating hydrogen halide from the tri-carbocyclic aryl-$R_1$-phosphonium halide, such as a suitable alkali metal organic compound, for example, a lower alkyl alkali metal compound, e.g. n-butyl lithium and the like. Preferably, the tri-carbocyclic aryl-$R_1°$-phosphoran reagent is not isolated, but is reacted in solution with the inert solvent, e.g. tetrahydrofuran and the like, or solvent mixture used during its preparation. Usually, the reagent and the 1-$R_2$-3-R-5-$R_a$-5-$R_b$-1,2,3,4-tetrahydro-5H - 1,4-methano-3-benzazepin-2-one compound are combined at room temperature, if necessary, in the atmosphere of an inert gas, e.g. nitrogen, and/or in a closed vessel; heating may be required to complete the reaction.

Furthermore, the scope of this invention also includes the procedure for the preparation of the 1-$R_2$-2-$R_1°$-3-R-5-$R_a$-5-$R_b$-1,2,3,4-tetrahydro - 5H-1,4-methano-3-benzazepines, in which R, $R_2$, $R_a$, $R_b$ and $R_1°$ have the previously-given meaning, the latter being an organic ylidene radical having aliphatic characteristics, or a lower alkyl quaternary ammonium derivative thereof, which comprises reacting a 1-$R_2$-3-R-5-$R_a$-5-$R_b$-1,2,3,4-tetrahydro - 5H - 1,4-methano-3-benzazepin-2-one, in which R, $R_2$, $R_a$ and $R_b$ have the previously-given meaning, with an organo-metallic reagent of the formula $M^{\oplus}R_1^{\ominus}$, in which $R_1^{\ominus}$ and $M^{\oplus}$ have the previously-given meaning, or with a tri-carbocyclic aryl-$R_1°$-phosphorane reagent, in which $R_1°$ has the previously-given meaning, or treating a 1-$R_2$-2-$R_1$-3-R-5-$R_a$-5-$R_b$-1,4-dihydro - 1,4 - methano-3-benzazepinium salt, in which R, $R_1$, $R_2$, $R_a$ and $R_b$ have the previously-given meaning, with a basic reagent, and, if desired, converting a resulting compound into a lower alkyl quaternary ammonium derivative.

Conversion of a 1-$R_2$-2-$R_1$-3-R-5-$R_a$-5-$R_b$-1,4-dihydro-5H-1,4-methano-3-benzazepinium salt into a 1-$R_2$-2-$R_1°$-3-R-5-$R_a$-5-$R_b$-1,2,3,4-tetrahydro-5H-1,4-methano - 3 - benzazepine starting material is carried out according to known methods, for example, by reacting it with a basic reagent, such as a metal hydroxide, e.g. sodium hydroxide, potassium hydroxide, calcium hydroxide and the like, a metal carbonate, e.g. sodium, potassium or calcium carbonate or hydrogen carbonate and the like, ammonia, or any other suitable basic reagent, or with a hydroxyl anion exchange preparation.

Lower alkyl quaternary ammonium compounds of 1-

$R_2$-2-$R_1$°-4-R-5-$R_a$-5-$R_b$-1,2,3,4-tetrahydro - 1,4 - ethano-isoquinoline compounds, in which R, $R_2$, $R_1$°, $R_a$ and $R_b$ have the previously given meaning, $R_1$° being an organic ylidene radical having aliphatic characteristics, are especially those with reactive esters of sterically non-hindered lower alkanols, especially primary lower alkanols. Particularly useful are unbranched lower alkyl halides, e.g. methyl, ethyl or n-propyl chloride, bromide or iodide and the like, di-unbranched lower alkyl-sulfates, e.g. dimethyl sulfate, diethyl sulfate and the like, unbranched lower alkyl organic sulfonates, e.g. methyl or ethyl methane sulfonate, 2-hydroxy-ethane sulfonate or p-toluene sulfonate and the like. The quaternizing reaction is carried out in the absence or presence of a solvent or solvent mixture, while cooling or at an elevated temperature, in a closed vessel, and/or, in the atmosphere of an inert gas.

The 1-$R_2$-3-R-5-$R_a$ - 5 - $R_b$-1,2,3,4-tetrahydro-5H-1,4-methano-3-benzazepin-2-one intermediates used in the above preparation of the starting material are obtained, for example, by halogenating, particularly brominating, a 4-$R_2$-4-(N-R°-carbamyl)-1,2,3,4-tetrahydro-naphthalen-1-one, particularly a compound of the formula

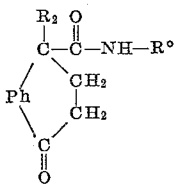

in which Ph and $R_2$ have the previously given meaning, and R° is hydrogen or an organic radical having aliphatic characteristics, for example, by treatment with bromine, if necessary, in the presence of acetic acid containing hydrogen bromide, and ring-closing the resulting 2-bromo-4-$R_2$-4-(N-R°-carbamyl) - 1,2,3,4 - tetrahydronaphthalen-1-one, particularly the compound of the formula

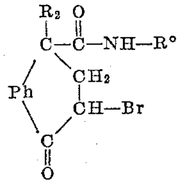

in which Ph, R° and $R_2$ have the previously-given meaning, by treatment with a suitable base, such as an alkali metal lower alkoxide, e.g. sodium methoxide and the like, to form the 1-$R_2$-3-R°-1,2,3,4-tetrahydro-5H-1,4-methano-3-benzazepin-2,5-dione, particularly a compound of the formula

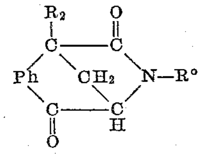

in which Ph, R° and $R_2$ have the previously-given meaning.

If desired, R° in the resulting 1-$R_2$-3-R°-1,2,3,4-tetrahydro-5H-1,4-methano-3-benzazepin-2,5-dione, whenever representing hydrogen, may be replaced by an organic radical having aliphatic characteristics, such replacement is carried out according to known methods. Thus, the salt of an intermediate, such as an alkali metal salt, thereof (prepared, for example, by treatment with a suitable salt-forming reagent, such as an alkali metal hydride or an alkali metal amide, e.g. lithium, sodium or potassium hydride or amide and the like, or with an alkali metal lower alkoxide, e.g. sodium or potassium methoxide, ethoxide or tertiary butoxide and the like, in the presence of a suitable solvent or solvent mixture, or any other procedure), may be reacted with the reactive ester of an alcohol of the formula R—OH, in which R has the previously-given meaning. Preferred reagents are lower alkyl halides, and the reaction is performed as previously described, if necessary, while cooling or at an elevated temperature, in a closed vessel and/or, in the atmosphere of an inert gas.

In a 1-$R_2$-3-R°-1,2,3,4-tetrahydro-5H-1,4-methano-3-benzazepin-2,5-dione, the carbonyl group representing the 5-position may be converted into the group of the formula —C($R_a$)($R_b$)—, in which $R_a$ and $R_b$ have the previously-given meaning, according to known methods. Thus, the particular carbonyl group may be converted into methylene ($R_a$ and $R_b$ being hydrogen) by generating the carbinol group (by reduction, for example, by treatment of the intermediate compound with hydrogen in the presence of a catalyst, with a complex light metal hydride, e.g. sodium borohydride and the like, or any other suitable reduction procedure), converting hydroxyl of the carbinol group in a resulting compound into halogeno (for example, by treatment of the intermediate compound with thionyl halide, e.g. thionyl chloride and the like, or any suitable halogenating reagent), and eliminating halogeno by reduction (for example, by treatment of the resulting compound with hydrogen in the presence of a catalyst, e.g. a palladium catalyst and the like). In the resulting 1-$R_2$-3-R°-1,2,3,4-tetrahydro - 5H - 1,4-methano-3-benzazepin-2-one, in which R° is hydrogen, the latter is replaced by an organic radical having aliphatic characteristics, according to the above-described procedure.

Furthermore, the carbonyl group representing the 5-position in a 1-$R_2$-3-R-1,2,3,4-tetrahydro-5H-1,4-methano-3-benzazepin-2,5-dione may be converted into a group of the formula —C($R_a$)($R_b$)—, in which at least one of the groups $R_a$ and $R_b$ is different from hydrogen, for example, by reacting the intermediate compound with a Grignard reagent of the formula $R_a^{\ominus\oplus}MgHal$, in which Hal has the previously-given meaning, and $R_a$ is an organic radical, according to known methods, and, if desired, replacing in a resulting 1-$R_2$-3-R-5-$R_a$-5-hydroxy-1,2,3,4-tetrahydro-5H-1,4-methano-3-benzazepin-2-one hydroxyl by hydrogen, for example, according to the previously-shown procedure, i.e. conversion of hydroxyl into halogeno and replacement of the latter by hydrogenolysis.

The 1 - $R_2$ - 2 - $R_1$ - 3 - R - 5 - $R_a$ - 5 - $R_b$ - 1,4 - dihydro-5H-1,4-methano-3-benzazepin compounds of this invention, in which each of the groups R, $R_1$, $R_2$, $R_a$ and $R_b$ have the previously-given meaning, $R_a$ and $R_b$ being primarily hydrogen, are also obtained by reacting an N-unsubstituted 1-$R_2$-2-$R_1$-5-$R_a$-5-$R_b$-1,4-dihydro-5H-1,4-methano-3-benzazepine, particularly a compound of the formula

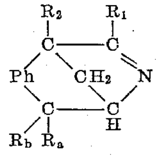

in which Ph, $R_1$, $R_2$, $R_a$ and $R_b$ have the previously-given meaning, $R_a$ and $R_b$ being primarily hydrogen, with a reactive ester of an alcohol of the formula R—OH, in which R has the previously-given meaning, and, if desired, carrying out the optional steps.

The above reaction is carried out according to known methods. The ester of an alcohol having aliphatic characteristics is more particularly the ester with an inorganic acid, for example, a hydrohalic acid, e.g. hydrochloric, hydrobromic, hydriodic acid and the like, sulfuric acid and the like, as well as the ester with a strong organic acid, particularly a strong organic sulfonic acid, e.g. methane sulfonic, ethane sulfonic, 2-hydroxyethane sulfonic, benzene sulfonic, 4-bromo-benzene sulfonic, p-toluene sulfonic acid and the like, or of any other suitable acid. Particularly useful as reactive esters of alcohols having aliphatic characteristics are organic halides having aliphatic characteristics, such as aliphatic halides, especially lower alkyl halides, e.g. methyl, ethyl, n-propyl, isopropyl, n-butyl, isobutyl, n-pentyl, n-hexyl or n-heptyl chloride, bromide or iodide and the like, as well as higher alkyl halides, as well as alkenyl halides, e.g. allyl or methallyl chloride, bromide or iodide and the like, cycloaliphatic halides, such as cycloalkyl halides, in which cycloalkyl has from three to eight, preferably from five to six, ring carbon atoms, e.g. cyclopropyl, cyclopentyl, cyclohexyl or cycloheptyl chloride, bromide or iodide and the like, cycloaliphatic-aliphatic halides, especially cycloalkyl-lower alkyl halides, in which cycloalkyl has from three to eight, preferably from five to six, ring carbon atoms, e.g. cyclopropylmethyl, cyclopentylmethyl, 3-cyclopentylpropyl, cyclohexylmethyl, 2-cyclohexylethyl or cycloheptylmethyl chloride, bromide or iodide and the like, and, particularly, aryl-aliphatic halides, especially monocyclic carbocyclic aryl-lower alkyl halides, such as the phenyl-lower alkyl halides, e.g. benzyl, 1-phenylethyl or 2-phenylethyl chloride, bromide or iodide, or any other suitable organic halide of aliphatic characteristics. Also useful as reactive esterified alcohols are organic sulfates, such as di-aliphatic sulfates, especially di-lower alkyl sulfates, e.g. dimethyl sulfate, diethyl sulfate and the like, or organic sulfonates having aliphatic characteristics, such as aliphatic organic sulfonates, for example, lower alkyl organic sulfonates, e.g. methyl or ethyl methane sulfonate, ethane sulfonate, 2-hydroxyethane sulfonate, benzene sulfonate, 4-bromo-benzene sulfonate, p-toluene sulfonate or naphthalene 2-sulfonate and the like, or any other reactive ester of an alcohol having aliphatic characteristics.

The above reaction for the preparation of the compounds of this invention is carried out in the absence or presence of a solvent, while cooling, at room temperature or at an elevated temperature; at atmospheric pressure or in a closed vessel under pressure; and, if necessary, in the atmosphere of an inert gas, e.g. nitrogen. Suitable diluents are more especially lower alkanols, e.g. methanol, ethanol, n-propanol, isopropanol, tertiary butanol, n-pentanol and the like, lower alkanones, e.g. acetone, ethyl methyl ketone and the like, organic acid amides, e.g. formamide, N,N-dimethylformamide and the like, aliphatic hydrocarbons, e.g. pentane, hexane and the like, halogenated hydrocarbon, e.g. methylene chloride, ethylene chloride and the like, monocyclic carbocyclic aryl hydrocarbon, e.g. benzene, toluene and the like, or any other suitable solvent or solvent mixture.

The starting materials used in the above reaction, as well as the salts thereof, are new and are intended to be included within the scope of this invention. Derivatives of the above N-unsubstituted 1-$R_2$-2-$R_1$-1,4-dihydro-1,4-methano-3-benzazepines, such as their salts, are useful as intermediates for their purification and/or identification; formation of these particular derivatives and their conversion into the parent compounds is achieved according to known methods. Salts of the starting materials are acid addition salts thereof, such as those with inorganic or organic salts, for example, those with the acids furnishing the anion of the quaternary compounds.

Especially useful starting materials are those of the formula

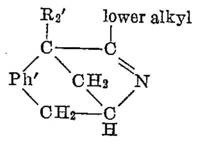

in which Ph′ and $R_2'$ have the previously-given meaning, as well as the acid addition salts thereof.

The above starting materials are prepared, for example, by treating a 1-$R_a$-1-$R_b$-2-$X_1$-4-[$R_1$—C(=$X_2$)]-4-$R_2$-1,2,3,4-tetrahydro-naphthalene compound, such as a compound of the formula

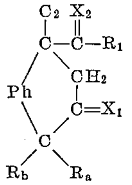

in which Ph, $R_1$, $R_2$, $R_a$ and $R_b$ have the previously-given meaning, $R_a$ and $R_b$ representing primarily hydrogen, and in which at least one of the groups $X_1$ and $X_2$ is a functionally converted, nitrogen-containing oxo group capable of being converted into amino by reduction, and the other is oxo or a functionally converted, nitrogen-containing oxo group capable of being converted into amino by reduction, or a salt thereof, with a theoretical amount of two molar equivalents of hydrogen in the presence of a metal catalyst, and, if desired, converting a resulting salt into the free compound or into another salt, and/or, if desired, converting a resulting compound into a salt thereof, and/or, if desired, separating a resulting mixture of isomeric compounds into the single isomers.

Although in a 1-$R_a$-1-$R_b$-2-$X_1$-4-[$R_1$—C(=$X_2$)]-4-$R_2$-1,2,3,4-tetrahydro-naphthalene intermediate compound only one of the groups $X_1$ and $X_2$, preferably $X_1$, is required to be a functionally converted, nitrogen-containing oxo group capable of being converted into amino by reduction, particularly a hydroxyimino group, both groups may represent functionally converted, nitrogen-containing oxo groups capable of being converted into amino by reduction, particularly hydroxyimino groups. Salts of the intermediate compounds are acid addition salts thereof; they are formed according to the procedure described below.

Treatment of the 1-$R_a$-1-$R_b$-2-$X_1$-4-[$R_1$—C(=$X_2$]-4-$R_2$-1,2,3,4-tetrahydro-naphthalene intermediate with hydrogen is carried out in the presence of a metal catalyst, containing a suitable heavy metal element of Group VIII of the Periodic System (i.e. a metal element of the Transition *b* Group), particularly palladium, platinum and the like. Preferred catalysts are platinum black, palladium black and the like. The hydrogenation reaction is performed under per se known conditions, preferably in the presence of a suitable solvent, e.g. acetic acid and the like, or solvent mixture, and, if necessary, at an elevated temperature, and/or in a closed vessel under pressure. The theoretical uptake of hydrogen is two molar equivalents; however, a slight excess of hydrogen absorption does not greatly impair the yields of the desired 1,4-dihydro-1,4-methano-benzazepine starting material.

The 1 - $R_a$ - 1 - $R_b$ - 2 - $X_1$ - 4 - [$R_1$—C(=$X_2$)] 4-$R_2$-1,2,3,4-tetrahydro-naphthalene intermediates are obtained, for example, by ring-closing a 4-[$R_1$—C(=O)]-4-$R_2$-4-monocyclic carbocyclic aryl-butyric acid compound, in which at least one of the ortho-positions of the monocyclic carbocyclic portion is unsubstituted, or a suitable derivative, for example, a halide or an anhydride, thereof, such as a compound of the formula

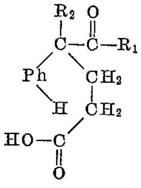

in which Ph, $R_1$ and $R_2$ have the previously-given meaning, or a suitable derivative thereof, such as a halide, e.g. chloride or anhydride thereof. Ring closure is achieved according to known methods, preferably by treatment with a suitable acidic ring closing reagent (e.g. sulfuric acid, polyphosphoric acid, aluminum chloride, stannic chloride and the like), if necessary, at an elevated temperature, and/or in the presence of a diluent.

Into the 2-position of a resulting 4-[$R_1$—C(=O)]-4-$R_1$-1,2,3,4-tetrahydro-naphthalen-1-one, such as a compound of the formula

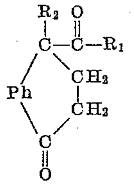

in which Ph, $R_1$ and $R_2$ have the previously-given meaning, there is introduced an oxygen function according to known methods. Such oxygen function is oxo or hydroxyl, as well as functionally converted oxo or hydroxyl. Thus, oxidation of the intermediate with suitable oxidation reagents, e.g. selenium dioxide and the like, affords the formation of a carbonyl group representing the 2-position. An esterified hydroxyl group may be introduced into the 2-position, for example, by brominating the 4-[$R_1$—C(=O)] - 4 - $R_2$ - 1,2,3,4 - tetrahydro - naphthalen-1-one intermediate according to the previously-described procedure, such as treatment with bromine, and replacing bromo in a resulting 4-[$R_1$—C(=O)]-4-$R_2$-2-bromo-1,2,3,4-tetrahydro-naphthalen-1-one by esterified hydroxyl (for example, by treatment with a suitable metal acylate reagent, such as a silver lower alkanoate, e.g. silver acetate and the like). The esterified hydroxyl group in a resulting intermediate compound may be converted into hydroxyl by hydrolysis.

In a resulting compound, the carbonyl group representing the 1-position is converted into the group of the formula —C($R_a$)($R_b$)—, in which $R_a$ and $R_b$ are primarily hydrogen, according to known methods. Thus, it may be removed by reduction, such as by treatment with catalytically activated hydrogen, if desired, stepwise. For example, under mild conditions, such as hydrogenation in the presence of a palladium catalyst, the oxo group of the 1-position is converted into hydroxyl; in case the 2-position is also substituted by hydroxyl, the 1-hydroxyl group can be removed by treatment with an acid, e.g. sulfuric acid and the like, whereby the 2-hydroxyl group is converted into oxo. Furthermore, the 1-oxo group is replaced by two hydrogens directly, if treatment with hydrogen is carried out in the presence of a palladium catalyst and acetic acid.

Furthermore, the oxo group in a 4-[$R_1$—C(=O)]-4-$R_1$-1,2,3,4-tetrahydro-naphthalen-1-one may be converted into hydroxyl (for example, by treatment with catalytically activated hydrogen under mild conditions, using palladium-on-charcoal, Raney nickel and the like, as the catalyst), dehydrating the resulting 4-[$R_1$—C(=O)]-4-$R_1$-1,2,3,4-tetrahydro-naphthalen-1-ol (for example, by treatment with an acid reagent, e.g. hydrogen chloride in acetic acid, sulfuric acid and the like), treating the 4-[$R_1$—C(=O)]-4-$R_1$-3,4-dihydro-naphthalene with an epoxidizing reagent (such as a peracid, e.g. performic, peracetic, perbenzoic, per-trifluoroacetic acid and the like), and splitting the epoxy ring in the resulting compound with an acid (for example, dilute sulfuric acid and the like) to yield the desired starting material, in which $R_a$ and $R_b$ are hydrogen.

Any hydroxyl group substituting the 2-position, as well as any hydroxyl group generated from the oxo portion of the $R_1$—(C=O)— substituent of the 4-position of the 1,2,3,4-tetrahydronaphthalene ring during any of the above reduction procedures is converted into oxo according to known oxidation procedures, such as treatment with a suitable chromium oxidation reagent, e.g. chromium trioxide-pyridine, sodium dichromate in sulfuric acid and the like.

In the resulting 1-$R_a$-1-$R_b$-4-[$R_1$—C(=O)]-4-$R_2$-

1,2,3,4-tetrahydro-naphthalen-2-one, such as a compound of the formula

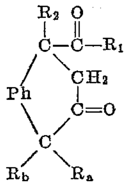

in which Ph, $R_1$ and $R_2$ have the previously-given meaning, at least one of the two oxo groups is then converted into a functionally converted, nitrogen-containing oxo group capable of being converted into amino by reduction.

As mentioned above, a functionally converted, nitrogen-containing oxo group capable of being converted into amino by reduction, is above all a hydroxyimino group, but may also be an imino group. Formation of such group is achieved according to known methods, for example, by treating the 1-$R_a$-1-$R_b$-4-[$R_1$—C(=O)]-4-$R_2$-1,2,3,4-tetrahydro-naphthalen-2-one compound with a suitable reagent capable of converting an oxo group into a functionally converted, nitrogen-containing oxo group capable of being converted into amino by reduction, above all with hydroxylamine, or, especially, an acid addition salt thereof, such as the hydrochloride, sulfate and the like thereof. The hydroxylamine reagent, which gives rise to the formation of the desired 1-$R_a$-1-$R_b$-2-$X_1$-4-[$R_1$—C(=$X_2$)]-4-$R_2$-1,2,3,4-tetrahydro-naphthalene intermediate used in the formation of the starting material, in which one of the groups $X_1$ and $X_2$ is a hydroxyimino group, and the other is oxo or a hydroxyimino group, is preferably used in the presence of a diluent; in case an acid addition salt of hydroxylamine represents the reagent, a base, e.g. sodium hydroxide, potassium hydroxide and the like, is employed. If necessary, the reaction is carried out while cooling or at an elevated temperature, in a closed vessel, and/or in the atmosphere of an inert gas, e.g. nitrogen. Ammonia, under certain conditions (for example, in a closed vessel and at elevated temperatures), may be used for the conversion of an oxo group into an imino group.

In the compounds of this invention, the anion may be converted into another anion; such conversion is performed according to known methods. For example, a salt may be converted into the base with an alkaline reagent, with a hydroxyl ion exchange preparation and the like, and a resulting base, which may also be obtained by treating a halide salt with silver oxide or a sulfate salt with barium hydroxide, is converted into a salt, for example, by reacting it with an acid, as well as with an anion exchange preparation. Furthermore, the anion of a resulting salt may be converted directly into another anion according to known methods. Thus, an iodide salt, when reacted with freshly prepared silver chloride or with hydrogen chloride in anhydrous methanol, yields the corresponding chloride salt. Furthermore, the anion, for example, a halide, such as the iodide, ion may be exchanged for another anion, for example, another halide, such as the chloride, ion by treatment with a suitable anion exchange preparation, such as, for example, with Amberlite IRA 400 (as described in U.S. Patent No. 2,591,573).

The resulting N-substituted 1,4-dihydro-5H-1,4-methano-3-benzazepinium salts may be reduced, for example, with the use of complex light metal hydrides, such as alkali metal borohydrides, e.g. sodium borohydride. Of the resulting 2,3-dihydro compounds, especially useful are those which are derived from the compounds mentioned in column 3, lines 20–42. In the reduction with complex light metal hydrides, the free bases of the 2,3-dihydro compounds are obtained. They may be converted according to known methods into acid addition salts containing the above mentioned anions $An^{\ominus}$.

The above pharmacologically active compounds of the invention, their starting materials and intermediates, whenever present in the form of mixtures of isomeric compounds or racemates, may be separated into the single isomers or optically active forms according to known separation methods, such as fractional crystallization, chromatography and the like.

The invention also comprises any modification of the process wherein a compound obtainable as an intermediate at any stage of the process is used as the starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as embodiments of the invention.

The following examples are intended to illustrate the invention and are not to be construed as being limitations thereon. Temperatures are given in degrees centigrade.

*Example 1*

The diethyl ether solution of 3-methyl-2methylene-1-phenyl - 1,2,3,4 - tetrahydro - 5H - 1,4 - methano - 3-benzazepine (prepared according to the procedure described below) is treated with a stoichiometric amount of a 5 percent ethanol solution of hydrogen chloride. The resulting precipitate is suspended in anhydrous diethyl ether containing a small amount of ethanol; it crystallizes, is filtered off and washed with the above solvent mixture. The desired 2,3-dimethyl-1-phenyl-1,4-dihydro-5H-1,4-methano-3-benzazepinium chloride of the formula

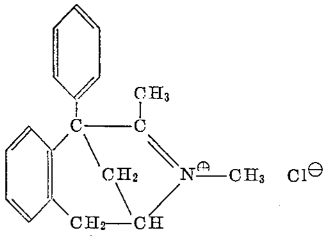

(yield: 2.0 g.) is collected and recrystallized from a mixture of ethanol and diethyl ether; it melts at 149.5–152° (with decomposition) as the sesquihydrate after drying under reduced pressure at room temperature, and analyzes as follows:

Calcd. for $C_{19}H_{20}C1N3/2H_2O$; C, 70.25; H, 7.14; N, 4.31. Found: C, 70.35; H, 6.98; N, 4.34.

Its infared spectrum (taken in mineral oil) has a broad hydroxyl band (due to water of crystallization), an immonium band at 4.69$\mu$ and a peak at 5.99$\mu$.

The starting material used in the above procedure is prepared as follows: To a solution of 96.5 g. of diphenyl-acetonitrile and 60.0 g. of ethyl acrylate in 200 ml. of tetrahydrofuran are added three 2 ml. portions of a 40 percent solution of triethyl-benzyl-ammonium hydroxide in tertiary butanol. After the exothermic reaction subsides, the reaction mixture is refluxed for two hours, the solvent is evaporated and the residue is dissolved in chloroform. The organic solution is washed with 50 ml. of 2 N hydrochloric acid and twice with water, dried and evaporated to yield the ethyl 4-cyano-4,4-diphenyl-butyrate, which is purified by distillation and collected at 145–160°/0.2 Torr.

A total of 300 ml. of 2 N aqueous sodium hydroxide is added in portions to a solution of 146.5 g. of ethyl 4-cyano-4,4-diphenyl-butyrate in 700 ml. of methanol at such a rate that the solution does not turn turbid. After warming for a short period on the water bath, 800 ml. of water is added and the reaction mixture is allowed to stand for two hours at 25°. A small amount of diphenyl-acetonitrile crystallizes and is filtered off, the filtrate is acidified with 5 N hydrochloric acid and the resulting precipitate is filtered off after cooling to 5° and washed with water. After drying for one day at 80°/100 mm., the resulting 4-cyano-4,4-diphenyl-butyric acid melts at 160–161° after recrystallization from a mixture of ethyl acetate and petroleum ether.

A total of 132.5 g. of 4-cyano-4,4-diphenyl-butyric acid is added in portions and over a period of one hour to 450 ml. of 100 percent sulfuric acid; during the addition, the temperature of the reaction mixture rises to 45°. The clear solution is allowed to stand for twenty-four hours at 25° and is then added to 3000 ml. of ice-water while stirring and cooled to 5°. The crystalline precipitate is filtered off, washed with water and dissolved in 500 ml. of chloroform. The small amount of water is removed, the organic solution is dried over sodium sulfate and evaporated. The resulting 4-carbamyl-4-phenyl-1,2,3,4-tetrahydro-naphthalen-1-one melts at 187° after recrystallization from ethyl acetate.

A solution of 87.0 g. of 4-carbamyl-4-phenyl-1,2,3,4-tetrahydro-naphthalen-1-one in 350 ml. of glacial acetic acid (prepared at 50°) is treated with 1 ml. of a 30 percent solution of hydrogen bromide in glacial acetic acid and then dropwise with 55.4 g. of bromine while vigorously stirring and keeping the temperature below 60°. The resulting solution is evaporated under reduced pressure, and the residue is recrystallized from a mixture of ethyl acetate, diethyl ether and petroleum ether to yield the 2 - bromo - 4 carbamyl - 4 - phenyl - 1,2,3,4 - tetrahydro-naphthalen-1-one, M.P. 178–181°.

A solution of 17.6 g. of sodium in 750 ml. of absolute methanol is cooled to 15° and treated with portions of 92.7 g. of 2-bromo-4-carbamyl-4-phenyl-1,2,3,4-tetrahydronaphthalen-1-one, which is added over a period of five minutes and while stirring. The temperature rises to about 28–30°; the reaction mixture is stirred for an additional hour, cooled to 0° and treated with 200 ml. of water. The precipitate is filtered off, washed with water and dried at 70° under reduced pressure. The resulting 1 - phenyl - 1,2,3,4 - tetrahydro - 5H - 1,4 - methano-3-benzazepin-2,5-dione melts at 209–211° after recrystallization from a mixture of chloroform and diethyl ether.

A mixture of 26.3 g. of 1-phenyl-1,2,3,4-tetrahydro-5H-1,4-methano-3-benzazepin-2,5-dione and 400 ml. of ethanol containing 1.5 g. of platinum oxide is treated with hydrogen under atmospheric pressure and at 25°. After the absorption of one molar equivalent of hydrogen, the catalyst is filtered off, the filtrate is evaporated, and the residue is crystallized from a mixture of ethyl acetate and petroleum ether to yield the 5$\beta$-hydroxy-1-phenyl-1,2,3,4 - tetrahydro - 5H - 1,4 - methano - 3 - benzazepin-2-one, M.P. 205°.

A mixture of 26.5 g. of 5$\beta$-hydroxy-1-phenyl-1,2,3,4-tetrahydro-5H-1,4-methano-3-benzazepin-2-one and 30 ml. of thionyl chloride in 50 ml. of methylene chloride is refluxed for six hours and evaporated. The residue is taken up in diethyl ether and allowed to stand until the reaction subsides. After cooling to 0°, the precipitate is filtered off to yield the 5$\xi$-chloro-1-phenyl-1,2,3,4-tetrahydro - 5H-1,4-methano-3-benzazepin-2-one, which melts at 244–245° after recrystallization from a mixture of chloroform and diethyl ether.

A mixture of 4.9 g. of 5$\xi$-chloro-1-phenyl-1,2,3,4-tetrahydro-5H-1,4-methano-3-benzazepin-2-one and 1.0 g. of palladium black (ten percent) in 200 ml. of ethanol is treated with hydrogen under atmospheric pressure and at 42°. After about one molar equivalent of hydrogen has been absorbed, the catalyst is filtered off from the warm solution and is three times extracted with chloroform at boiling temperature. The combined filtrates are evaporated to yield 1-phenyl-1,2,3,4-tetrahydro-5H-1,4-methano-3-benzazepin-2-one, which melts at 235–236° after recrystallization from isopropanol.

A solution of 24.9 g. of 1-phenyl-1,2,3,4-tetrahydro-5H-1,4-methano-3-benzazepin-2-one in 500 ml. of dry dioxane is treated with 6.0 g. of finely pulverized sodium amide and refluxed for two hours. After cooling to 10°, the reaction mixture is treated with 20.2 g. of methyl iodide, stirred at 20° during five hours, and refluxed for ten hours. After cooling, 60 ml. of methanol is added dropwise; the inorganic precipitate is filtered off, the filtrate is evaporated, and the residue is dissolved in chloroform. The organic solution is washed twice with water, dried over sodium sulfate and evaporated to yield the semicrystalline 3 - methyl - 1-phenyl-1,2,3,4-tetrahydro-5H-1,4-methano-3-benzazepin-2-one, which melts at 159–161° after recrystallization from a mixture of ethanol and ethyl acetate.

A solution of 2.0 g. of 3-methyl-1-phenyl-1,2,3,4-tetrahydro-5H-1,4-methano-3-benzazepin-2-one in 100 ml. of benzene is treated with 19 ml. of a 1.92 molar solution of methyl lithium in diethyl ether. After refluxing and chilling, the reaction mixture is poured onto a mixture of ice and water. The organic material is extracted with diethyl ether; the organic portion is washed with two portions of water and is then extracted with two small portions of a 1:1-mixture of concentrated hydrochloric acid and water and with water. The combined aqueous extracts are chilled and made basic by gradually adding an ice-cold concentrated solution of sodium hydroxide in water. The oily organic material is extracted with diethyl ether; the organic solution is washed with two portions of water, dried over potassium carbonate and evaporated carefully to a volume of about 100 ml. The desired 3-methyl - 2 - methylene - 1-phenyl-1,2,3,4-tetrahydro-5H-1,4-methano-3-benzazepine of the formula

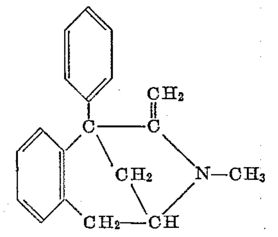

does not crystallize and is directly used in the above procedure.

*Example 2*

To the diethyl ether solution of 1-ethyl-2-methylene-3 - methyl - 1,2,3,4-tetrahydro-5H-1,4-methano-3-benzazepine (prepared according to the procedure described below) is added a slight excess of an about 10 precent aqueous solution of hydrogen iodide. The precipitate (yield: 3.4 g.) is filtered off and recrystallized from a mixture of methanol, ethanol and diethyl ether to yield the 2,3 - dimethyl-1-ethyl-1,4-dihydro-5H-1,4-methano-3-benzazepinium iodide of the formula

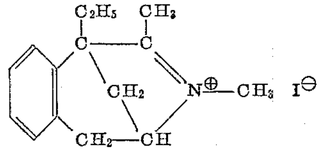

which melts at 253–254° (with decomposition) and analyzes as follows:

Calcd. for $C_{15}H_{20}IN$: C, 52.79; H, 5.91; N, 4.11. Found: C, 52.78; H, 5.99; N, 4.08.

Its infrared absorption spectrum (taken in mineral oil) shows a strong, sharp peak at 6.01$\mu$.

The starting material used in the above procedure is prepared as follows: A solution of 43.4 g. of 4-carbamyl-4-ethyl-1,2,3,4-tetrahydro-naphthalen-1-one in 140 ml. of glacial acetic acid is treated with 32.0 g. (=10.2 ml.) of bromine while maintaining a temperature of 20°. After decolorization, the reaction mixture is evaporated under reduced pressure, and the oily residue is triturated with 100 ml. of ethyl acetate to yield the crystalline 2-bromo-4 - carbamyl - 4-ethyl-1,2,3,4-tetrahydro-naphthalen-1-one, which melts at 163–165° (with decomposition) after recrystallization from chloroform.

To a solution of 4.6 g. of sodium in 200 ml. of absolute ethanol is added in portions and over a short period of time 14.8 g. of 2-bromo-4-carbamyl-4-ethyl-1,2,3,4-tetrahydro-naphthalen-1-one while vigorously stirring; the temperature of the reaction mixture rises to 27°, and a solution is quickly obtained. After some time, a crystalline precipitate is formed; the reaction mixture is concentrated to about half of its original volume and is then carefully diluted with 250 ml. of water. After cooling to 0°, the 1-ethyl-1,2,3,4-tetrahydro-5H-1,4-methano-3-benzazepin-2,5-dione precipitates and is filtered off, M.P. 208–210°.

To a suspension of 15.0 g. of finely pulverized sodium amide in 500 ml. of toluene is added 53.75 g. of 1-ethyl-1,2,3,4 - tetrahydro - 5H-1,4-methano-3-benzazepin-2,5-dione. The reaction mixture is refluxed until the ammonia evolution subsides; it is then cooled and treated with 43.0 g. of methyl iodide. After stirring at room temperature for four hours and refluxing for an additional eight hours, 20 ml. of methanol is added dropwise and then 200 ml. of water. The organic phase is separated, washed with 50 ml. of water; the aqueous layer is extracted with methylene chloride, which is washed neutral with water. The organic solutions are combined, dried over sodium sulfate and evaporated to yield the 1-ethyl - 3 - methyl - 1,2,3,4-tetrahydro-5H-1,4-methano-3-benzazepin-2,5-dione, which melts at 130–131° after recrystallizations from a mixture of ethyl acetate and petroleum ether and from ethyl acetate.

A mixture of 22.9 g. of 1-ethyl-3-methyl-1,2,3,4-tetrahydro-5H-1,4-methano-3-benzazepin-2,5-dione and 0.5 g. of platinum oxide in 250 ml. of ethanol is treated with hydrogen under atmospheric pressure and at 30°. After about one molar equivalent of hydrogen has been absorbed, the catalyst is filtered off, the filtrate is evaporated, washed with 50 ml. of water; the aqueous layer is 1,2,3,4 - tetrahydro-5H-1,4-methano-3-benzazepin-2-one is recrystallized from a mixture of ethyl acetate and petroleum ether, M.P. 197–198°.

A solution of 23.1 g. of 1-ethyl-5$\beta$-hydroxy-3-methyl-1,2,3,4 - tetrahydro-5H-1,4-methano-3-benzazepin-2-one in 125 ml. of methylene chloride is treated with 23.8 g. of thionyl chloride; the reaction mixture is refluxed for six hours and is then evaporated under reduced pressure. The residue is dissolved in 100 ml. of diethyl ether, the organic solution is washed twice with water, dried over sodium sulfate and placed on a column of 50 g. of aluminum oxide containing two percent of water. The oily 5$\xi$ - chloro - 1 - ethyl-3-methyl-1,2,3,4-tetrahydro-5H-1,4-methano-3-benzazepin-2-one is eluted with methylene chloride and is used without further purification.

A solution of 27.7 g. of 5$\xi$-chloro-1-ethyl-3-methyl-1,2,3,4-tetrahydro-5H-1,4-methano-3-benzazepin-2-one in 250 ml. of ethanol containing 1.2 g. of palladium black (10 percent) is treated with hydrogen at atmospheric pressure. After the uptake of one molar equivalent of hydrogen, the catalyst is filtered off, the filtrate is evaporated and the residue is dissolved in diethyl ether. The organic solution is washed with an aqueous sodium hydrogen carbonate solution and with water, dried over sodium sulfate and evaporated to yield the oily 1-ethyl-3-methyl-1,2,3,4-tetra-hydro-5H-1,4-methano-3-benzazepin - 2 - one, which slowly crystallizes and melts at 80–81° after recrystallization from a mixture of diethyl ether and petroleum ether.

A solution of 2.4 g. of 1-ethyl-3-methyl-1,2,3,4-tetrahydro-5H-1,4-methano-3-benzazepin-2-one in 100 ml. of benzene is treated with 15 ml. of a 1.92 molar solution of methyl lithium in diethyl ether. The reaction mixture is briefly warmed to 40–45°, is allowed to stand overnight at room temperature and is then poured onto ice. A small amount of diethyl ether is added, the organic layer is separated, washed with several portions of water and extracted with three 25 ml. portions of a 1:1-mixture of concentrated hydrochloric acid and water. The acidic solutions are combined and made alkaline with a concentrated aqueous solution of sodium hydroxide while cooling. The desired 1-ethyl-3-methyl-2-methylene-1,2,3,4-tetrahydro-5H-1,4-methano-3-benzazepine of the formula

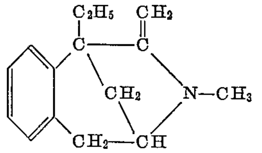

separates as an oil and is extracted with diethyl ether; the organic solution is washed with several portions of water, dried over potassium carbonate and used without further purification.

*Example 3*

To 100 ml. of the diethyl ether solution of 1-phenyl-2-methylene - 3,5 - dimethyl-5-hydroxy-1,2,3,4-tetrahydro-5H-1,4-methano-3-benzazepine (prepared according to the procedure described below) a slight excess of a 10% solution of hydrogen iodide in aqueous ethanol is added. The yellowish crystals formed are collected, recrystallized first from ethanol-diethyl-ether, then from ethanol and dried in vacuo at 65°, to yield the 1-phenyl-2,3,5-trimethyl-5 - hydroxy-1,4-dihydro-5H-1,4-methano-3-benzazepinium iodide of the formula

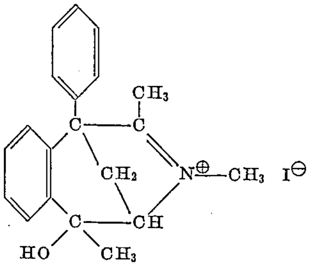

M.P. 278–280° (dec.), $\lambda_{max.}^{nujol}$ 6.05$\mu$ and $_{max.}^{methanol}$ 210 m$\mu$ ($\epsilon$=27,470) with inflection at 260 m$\mu$ ($\epsilon$=4280).

The starting material can be prepared as follows:

The solution of 3.0 g. of 1-phenyl-2-oxo-3,5-dimethyl-5 - hydroxy-1,2,3,4-tetrahydro-5H-1,4-methano-3-benzazepine in 300 ml. of dry benzene is treated with 70 ml. of a 1.92 molar solution of methyl lithium in diethyl ether and the mixture is refluxed for two hours. The cooled suspension is poured over ice and water, ether is added and, after shaking, the layers are separated. The organic layer is washed with several portions of water, then extracted with two small portions of cold 18% aqueous hydrochloric acid and washed with water. The dried, evaporated organic layer gives back a negligible amount of the starting lactam. The acidic aqueous solutions are chilled, made basic by gradual addition of cold, concentrated sodium hydroxide solution and the oily base separated is extracted with ether. The ether solution (300 ml.) is washed with water, dried over potassium carbonate, filtered and evaporated to a volume of 100 ml. It contains the 1-phenyl-2-methylene-3,5-dimethyl-5-hydroxy - 1,2,3,4 - tetrahydro - 5H-1,4-methano-3-benzazepine.

*Example 4*

To 150 ml. of the diethyl ether solution described below and containing 1,5-diphenyl-2-methylene-3-methyl-5-hydroxy - 1,2,3,4-tetrahydro-5H-1,4-methano-3-benzazepine a slight excess of an about 5 to 10% solution of hydrogen iodide in aqueous ethanol is added until the precipitation of the yellowish salt ceases. It is filtered off, washed with diethyl ether and recrystallized from ethanol-diethyl ether to yield the 1,5-diphenyl-2,3-dimethyl-5-hydroxy - 1,4 - dihydro-5H-1,4-methano-3-benzazepinium iodide of the formula

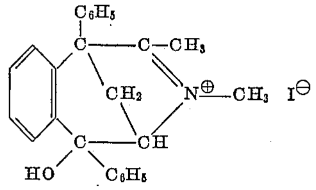

M.P. 275–277° C. (dec.), $\lambda_{max.}^{nujol}$ 6.03$\mu$, $\lambda_{max.}^{methanol}$ 258 m$\mu$ ($\epsilon$=5260) with inflections at 213, 252 and 264 m$\mu$. ($\epsilon$=37,760, 5280 and 4820 respectively).

The starting material is prepared as follows:

To the solution of 5.0 g. of 1,5-diphenyl-2-oxo-3-methyl-5 - hydroxy - 1,2,3,4-tetrahydro-5H-1,4-methano-3-benzazepine in 600 ml. of dry benzene, 70 ml. of a 2.0 molar solution of methyl lithium in diethyl ether are added and the mixture is refluxed for one hour. After standing for 2½ hours to cool to room temperature it is poured into ice water, the organic layer separated and extracted with several small portions of cold 18% aqueous hydrochloric acid. From the combined acidic extracts the base defined in the beginning is regenerated by treatment with concentrated aqueous sodium hydroxide at 0°. It is extracted with diethyl ether, the extract washed with water, dried and evaporated to the convenient volume of 150 ml.

*Example 5*

According to the method described in Examples 2, 3 and 4 the 1-phenyl-2-methylene-3-methyl-1,2,3,4-tetrahydro-5H-1,4-methano-3-benzazepine obtained in Example 1 is converted into the 1-phenyl-2,3-dimethyl-1,4-dihydro-5H-1,4-methano-3-benzazepinium iodide which melts (after recrystallization from ethanol-diethyl ether and then from ethanol and drying in vacuo) at 265–267°, $\lambda_{max.}^{nujol}$ 6.02$\mu$, $\lambda_{max.}^{methanol}$ 211 and 258 m$\mu$ ($\epsilon$=28,700 and 3900 respectively) with inflection at 289 m$\mu$ ($\epsilon$=2250).

3.2 g. thereof are dissolved in 350 ml. of methanol and the stirred solution is treated with 15.0 g. of sodium borohydride in small portions over a period of two hours while warming on a steam cone to complete the reaction and to decompose the excess hydride. After evaporation of most of the methanol, the cooled residue is treated with about 3 liters of ice-water and the oily base is extracted with diethyl ether. The ethereal solution is washed several times with water, dried over potassium carbonate, filtered and evaporated. A solution of the residual, crude base in diethyl ether is decolorized with charcoal and treated with a slight excess of ethanolic hydrochloric acid to convert it into the hydrochloride. It precipitates in colorless crystals and is recrystallized from ethanol-diethyl ether to give the 1-phenyl-2,3-dimethyl-1,2,3,4-tetrahydro-5H-1,4-methano-3-benzazepine hydrochloride of the formula

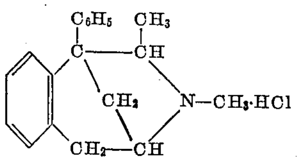

melting at 299–300° with decomposition;

$\lambda_{max.}^{nujol}$ 3.92–4.00$\mu$

*Example 6*

To a solution of 2.5 g. of 1-phenyl-2,3,5-trimethyl-5-hydroxy - 1,4 - dihydro-5H-1,4-methano-3-benzazepinium iodide in 175 ml. of methanol 12.5 g. of sodium borohydride are added with stirring while heated on a steam cone for 2 hours. After evaporation of the methanol, the cooled residue is mixed with ice-water and the whole is extracted with diethyl ether. The ether solution is washed with water, dried, filtered and evaporated to yield the crystalline 1-phenyl-2,3,5-trimethyl-5-hydroxy-1,2,3,4-tetrahydro-5H-1,4-methano-3-benzazepine of the formula

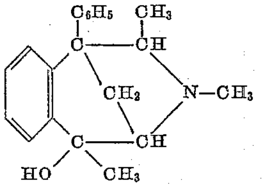

which upon trituration with petroleum ether melts at 109–111°;

$$\lambda_{max.}^{nujol}\ 2.94\text{–}2.96\mu \text{ and } 6.23\mu$$

It is converted into its hydrochloride by combining an ethereal solution thereof with ethanolic hydrochloric acid and recrystallizing the precipitate formed from ethanol-diethyl ether, M.P. 256–258° (dec.).

*Example 7*

To the stirred solution of 4.6 g. of 1,5-diphenyl-2,3-dimethyl - 5-hydroxy - 1,4 - dihydro-5H-1,4-methano-3-benzazepinium iodide in 200 ml. of methanol 17.5 g. of sodium borohydride are added in portions while heating the mixture for 2 hours on a steam cone. The mixture is evaporated, the cold residue shaken with water, the solid base filtered off, washed with water, dried and recrystallized from methanol. There is obtained the 1,5-diphenyl-2,3 - dimethyl - 5 - hydroxy - 1,2,3,4 - tetrahydro - 5H-1,4-methano-3-benzazepine of the formula

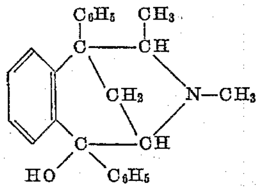

M.P. 187–188°, $$\lambda_{max.}^{nujol}\ 2.92 \text{ and } 6.21\mu,\ \lambda_{max.}^{methanol}\ 258\ m\mu$$

($\epsilon$=860).

It is converted into its hydrochloride which melts, after recrystallization from aqueous methanol, at 292–293° (dec.).

*Example 8*

10,000 capsules each containing 0.1 g. of the active ingredient.

| Material: | Gram |
|---|---|
| 1 - phenyl - 2,3,5 - trimethyl - 5 - hydroxy-1,4 - dihydro - 5H - 1,4 - methano - 3 - benzazepinium iodide | 1,000.0 |
| Lactose, U.S.P. | 2,500.0 |

Procedure:

The material is passed through a 16 mesh screen, placed in a suitable mixer and agitated until the powders are homogeneously distributed. Portions of 0.35 g. are filled into No. 1 gelatine capsules.

What is claimed is:

1. A member selected from the group consisting of a compound having the formula

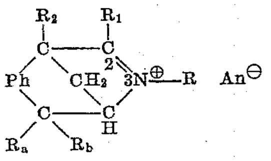

in which Ph stands for a member selected from the group consisting of 1,2-phenylene, (lower alkyl)-1,2-phenylene, lower alkoxy)-1,2-phenylene, (halogeno)-1,2-phenylene, (N,N-di-lower alkylamino)-1,2-phenylene and (trifluoromethyl)-1,2-phenylene, each of R and $R_1$ for a member selected from the group consisting of lower alkyl, lower alkenyl, cycloalkyl, cycloalkenyl, cycloalkyl-lower alkyl and cycloalkenyl-lower alkyl in which each cycloalkyl contains 3 to 8 and each cycloalkenyl 5 to 8 ring-carbon atoms, phenyl-lower alkyl, naphthyl-lower alkyl and pyridyl-lower alkyl, each of $R_2$ and $R_a$ for a member selected from the group consisting of hydrogen, lower alkyl, phenyl, (lower alkyl)-phenyl, (lower alkoxy)-phenyl, (halogeno)-phenyl, (N,N-di-lower alkylamino)-phenyl and (trifluoromethyl)-phenyl, $R_b$ for a member selected from the group consisting of hydrogen, hydroxyl, lower alkoxy, phenyl-lower alkoxy and lower alkanoyloxy, and $An^{\ominus}$ is the anion of an acid, its 2,3-dihydro-derivative and the free base thereof.

2. A benzazepinium salt as claimed in claim 1, in which formula Ph stands for a member selected from the group consisting of 1,2-phenylene, (lower alkyl)-1,2-phenylene, (lower alkoxy)-1,2-phenylene, (halogeno)-1,2-phenylene, (N,N-lower alkylamino)-1,2-phenylene and (trifluoromethyl)-1,2-phenylene, each of R and $R_1$ for lower alkyl, each of $R_2$ and $R_a$ for a member selected from the group consisting of hydrogen, lower alkyl, phenyl, (lower alkyl)-phenyl, (lower alkoxy)-phenyl, (halogeno)-phenyl, (N,N-di-lower alkylamino)-phenyl and (trifluoromethyl)-phenyl, $R_b$ for a member selected from the group consisting of hydrogen and hydroxyl and $An^{\ominus}$ for the anion of an acid.

3. A benzazepinium salt as claimed in claim 1, in which formula Ph stands for 1,2-phenylene, each of R and $R_1$ for lower alkyl, $R_2$ for a member selected from the group consisting of lower alkyl and phenyl, $R_a$ for a member selected from the group consisting of hydrogen, lower alkyl and phenyl, $R_b$ for a member selected from the group consisting of hydrogen and hydroxyl and $An^{\ominus}$ for a halogenid ion.

4. A compound as claimed in claim 1 and being the 2,3-dimethyl - 1 - phenyl - 1,4 - dihydro - 5H - 1,4-methano-3-benzazepinium chloride.

5. A compound as claimed in claim 1 and being the 2,3-dimethyl - 1 - ethyl - 1,4 - dihydro - 5H - 1,4 - methano-3-benzazepinium iodide.

6. A compound as claimed in claim 1 and being the 1-phenyl - 2,3,5 - trimethyl - 5 - hydroxy - 1,4 - dihydro-5H-1,4-methano-3-benzazepinium iodide.

7. A compound as claimed in claim 1 and being the 1,5-diphenyl - 2,3 - dimethyl - 5 - hydroxy - 1,4 - dihydro-5H-1,4-methano-3-benzazepinium iodide.

8. A compound of the formula

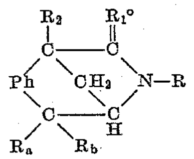

in which Ph stands for a member selected from the group consisting of 1,2-phenylene, (lower alkyl)-1,2-phenylene, (lower alkoxy)-1,2-phenylene, (halogeno)-1,2-phenylene, (N,N-di-lower alkylamino)-1,2-phenylene and (trifluoromethyl)-1,2-phenylene, R for a member selected from the group consisting of lower alkyl, lower alkenyl, cycloalkyl, cycloalkenyl, cycloalkyl-lower alkyl and cycloalkenyl-lower alkyl in which each cycloalkyl contains 3 to 8 and each cycloalkenyl 5 to 8 ring-carbon atoms, phenyl-lower alkyl, naphthyl-lower alkyl and pyridyl-lower alkyl, $R_1°$, for a member selected from the group consisting of lower alkylidene, lower alkenylidene, cycloalkylidene, cycloalkenylidene, cycloalkyl-lower alkylidene and cycloalkenyl-lower alkylidene in which each cycloalkylidene and cycloalkyl contains 3 to 8 and each cycloalkenylidene and cycloalkenyl 5 to 8 ring-carbon atoms, phenyl-lower alkylidene, naphthyl-lower alkylidene and pyridyl-lower alkylidene, each of $R_2$ and $R_a$ for a member selected from the group consisting of hydrogen, lower alkyl, phenyl, lower alkyl)-phenyl, (lower alkoxy)-phenyl, (halogeno)-phenyl, (N,N-di-lower alkylamino)-phenyl and (trifluoromethyl)-phenyl, $R_b$ for a member selected from the group consisting of hydrogen, hydroxyl, lower alkoxy, phenyl-lower alkoxy and lower alkanoyloxy.

9. A compound as claimed in claim 8, in which formula Ph stands for a member selected from the group consisting of 1,2-phenylene, (lower alkyl)-1,2-phenylene, (lower alkoxy)-1,2-phenylene, (halogeno)-1,2-phenylene, (N,N-di-lower alkylamino)-1,2-phenylene and (trifluoromethyl)-1,2-phenylene, R for lower alkyl, $R_1°$ for lower alkylidene, each of $R_2$ and $R_a$ for a member selected from the group consisting of hydrogen, lower alkyl, phenyl, (lower alkyl)-phenyl, (lower alkoxy)-phenyl, (halogeno)-phenyl, (N,N-di-lower alkylamino)-phenyl, and (trifluoromethyl)-phenyl and $R_b$ for a member selected from the group consisting of hydrogen and hydroxyl.

10. A compound as claimed in claim 8, in which formula Ph stands for 1,2-phenylenne, R for lower alkyl, $R_1°$ for lower alkylidene, $R_2$ for a member selected from the group consisting of lower alkyl and phenyl, $R_a$ for a member selected from the group consisting of hydrogen, lower alkyl and phenyl and $R_b$ for a member selected from the group consisting of hydrogen and hydroxyl.

11. A compound as claimed in claim 8 and being the 3-methyl - 2 - methylene - 1 - phenyl - 1,2,3,4 - tetrahydro-5H-1,4-methano-3-benzazepine.

12. A compound as claimed in claim 8 and being the 1-ethyl - 3 - methyl - 2 - methylene - 1,2,3,4 - tetrahydro-5H-1,4-methano-3-benzazepine.

13. A compound as claimed in claim 8 and being the 1 phenyl - 2 - methylene - 3,5 - dimethyl - 5 - hydroxy - 1,2,3,4-tetrahydro-5H-1,4-methano-3-benzazepine.

14. A compound as claimed in claim 8 and being the 1,5 - diphenyl - 2 - methylene - 3 - methyl - 5 - hydroxy-1,2,3,4-tetrahydro-5H-1,4-methano-3-benzazepine.

15. A compound as claimed in claim 1 and being a member selected from the group consisting of the compound having the formula

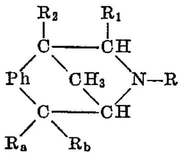

in which Ph stands for a member selected from the group consisting of 1,2-phenylene, (lower alkyl)-1,2-phenylene, (lower alkoxy)-1,2-phenylene, (halogeno)-1,2-phenylene, (N,N-lower alkylamino)-1,2-phenylene and (trifluoromethyl)-1,2-phenylene, each of R and $R_1$ for lower alkyl, each of $R_2$ and $R_a$ for a member selected from the group consisting of hydrogen, lower alkyl, phenyl, (lower alkyl)-phenyl, (lower alkoxy)-phenyl, (halogeno)-phenyl, (N,N-di-lower alkylamino)-phenyl and (trifluoromethyl)-phenyl and $R_b$ for a member selected from the group consisting of hydrogen and hydroxyl and an acid addition salt thereof.

16. A compound as claimed in claim 15 in which formula Ph stands for 1,2-phenylene, each of R and $R_1$ for lower alkyl, $R_2$ for a member selected from the group consisting of lower alkyl and phenyl, $R_a$ for a member selected from the group consisting of hydrogen, lower alkyl and phenyl, $R_b$ for a member selected from the group consisting of hydrogen and hydroxyl and of which the salt is a hydrohalide.

No references cited.

ALEX MAZEL, *Primary Examiner.*

MARY O'BRIEN, *Assistant Examiner.*